United States Patent
Chen et al.

(10) Patent No.: US 10,642,677 B2
(45) Date of Patent: May 5, 2020

(54) LOG-BASED DIAGNOSIS FOR DECLARATIVE-DEPLOYED APPLICATIONS

(71) Applicant: International Business Machines Corporation, Armonk, NY (US)

(72) Inventors: Peng Fei Chen, Beijing (CN); Fan Jing Meng, Beijing (CN); Jing Min Xu, Beijing (CN); Lin Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 15/802,108

(22) Filed: Nov. 2, 2017

(65) Prior Publication Data

US 2019/0129829 A1   May 2, 2019

(51) Int. Cl.
G06F 11/07     (2006.01)

(52) U.S. Cl.
CPC .................. G06F 11/079 (2013.01)

(58) Field of Classification Search
CPC ............... G06F 11/079; G06F 11/0793; G06F 11/1476; G06F 11/3447; G06F 11/3452
USPC .......................................... 714/26, 37, 38.1
See application file for complete search history.

(56) References Cited

U.S. PATENT DOCUMENTS

| | | | |
|---|---|---|---|
| 8,001,527 B1 | 8/2011 | Qureshi et al. | |
| 8,417,656 B2 * | 4/2013 | Beg | G05B 23/0243 706/45 |
| 8,612,377 B2 * | 12/2013 | Beg | G06F 11/079 706/52 |
| 9,122,694 B1 | 9/2015 | Dukes et al. | |
| 9,244,755 B2 | 1/2016 | Huang et al. | |
| 9,262,519 B1 | 2/2016 | Saurabh et al. | |
| 9,483,250 B2 | 11/2016 | Eilam et al. | |
| 9,590,872 B1 | 3/2017 | Jagtap et al. | |
| 10,338,991 B2 * | 7/2019 | Nallabothula | G06F 11/0709 |
| 2012/0159517 A1 | 6/2012 | Shen et al. | |
| 2014/0075032 A1 | 3/2014 | Vasudevan et al. | |
| 2014/0324865 A1 | 10/2014 | Mizutani | |
| 2016/0371132 A1 | 12/2016 | Prabhakara | |
| 2017/0017537 A1 * | 1/2017 | Razin | G06F 11/079 |

OTHER PUBLICATIONS

Dommati SJ, Agrawal R, Kamath SS; "Bug Classification: Feature Extraction and Comparison of Event Model using Naive Bayes Approach," International Conference on Recent Trends in Computer and Information Engineering; Apr. 5, 2013; pp. 8-12.*

Mell, Peter, et al. "The NIST Definition of Cloud Computing." National Institute of Standards and Technology. Sep. 2011. 7 pages.

(Continued)

*Primary Examiner* — Joseph R Kudirka

(74) *Attorney, Agent, or Firm* — Amin, Turocy & Watson, LLP

(57) ABSTRACT

Techniques for log-based diagnosis for declarative-deployed applications can comprise: based on a labeled deployment declaration, classifying, by a device operatively coupled to a processor, a runtime log associated with an application, resulting in a classified runtime log. Techniques can also comprise: based on the classified runtime log, training, by the device, an aggregation model to represent a defined state of the application.

17 Claims, 12 Drawing Sheets

(56) References Cited

OTHER PUBLICATIONS

Tak et al., "LOGAN: Problem Diagnosis in the Cloud Using Log-based Reference Models," IEEE International Conference on Cloud Engineering, 2016, pp. 62-67, IEEE, 6 pages.

Xu et al., "LogDC: Problem Diagnosis for Declartively-deployed Cloud Applications with Log," 2017, 8 pages.

"Sumo Logic Anomaly Detection Leverages Machine Learning," 2017, Sumo Logic, 5 pages. Retrieved on Jul. 20, 2017. https://www.sumologic.com/resource/datasheet/anomaly-detection/.

"Splunk® Enterprise Search Reference 6.4.1-anomalydetection," Jul. 20, 2017, Splunk Inc., 6 pages. https://docs.splunk.com/Documentation/Splunk/6.4.1/SearchReference/Anomalydetection.

Baier et al., "Matching of Events and Activities—An Approach Using Declarative Modeling Constraints," International Conference on Enterprise, Business-Process and Information Systems Modeling, May 2015, pp. 119-134, Springer Link, 16 pages.

Yu et al., "CloudSeer: Workflow Monitoring of Cloud Infrastructures via Interleaved Logs," Proceedings of the Twenty-First International Conference on Architectural Support for Programming Languages and Operating Systems, Apr. 2016, pp. 489-502, ACM, 14 pages.

Chen et al., "Transaction Discovery in a Log Sequence," IBM disclosure CN920160142US1, filed Nov. 21, 2016 and assigned U.S. Appl. No. 15/357,649, International Business Machines Corporation, 45 pages.

Chen et al., "Event Sequence Management," IBM disclosure CN920160226US1, filed Apr. 21, 2017 and assigned U.S. Appl. No. 15/493,249, International Business Machines Corporation, 31 pages.

\* cited by examiner

LOG-BASED DIAGNOSIS FOR DECLARATIVE-DEPLOYED APPLICATIONS

BACKGROUND

The subject disclosure relates to cloud-native applications, and more specifically, to log-based diagnosis for cloud-based applications.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate log-based diagnosis for declarative-deployed applications are described.

According to an embodiment, a system can comprise a memory that stores computer executable components, and a processor that executes the computer executable components stored in the memory. The computer executable components of the system can comprise a classification component that based on a labeled deployment declaration of an application, classifies a runtime log associated with the application, resulting in a classified runtime log. The computer executable components of the system can also comprise a training component that based on the classified runtime log, trains an aggregation model to represent a defined state of the application.

According to another embodiment, a computer program product that facilitates log-based diagnosis for declarative-deployed applications can comprise a computer readable storage medium having program instructions embodied therewith. The program instructions can be executable by a processor and the processor can classify a runtime log associated with the application based on a labeled deployment declaration, resulting in a classified runtime log. The program instructions can also be executable to train, by the processor, an aggregation model to represent a defined state of the application based on the classified runtime log.

According to yet another embodiment, a computer-implemented method is provided. The computer-implemented method can comprise, classifying, by a device operatively coupled to a processor, a runtime log associated with an application based on a labeled deployment declaration, resulting in a classified runtime log. Furthermore, the computer-implemented method can comprise training, by the device, an aggregation model to represent a defined state of the application based on the classified runtime log.

According to yet another embodiment, a system can comprise a memory that stores computer executable components, and a processor that executes the computer executable components stored in the memory. The computer executable components of the system can comprise a tokenizing component that applies one or more tokens to data associated with a deployment declaration of an application and separates the data according to the one or more tokens, resulting in on or more separated tokens. The computer executable components of the system can also comprise a filtering component that removes one or more extraneous tokens from the one or more separated tokens, resulting in a reduced number of the one or more separated tokens, based on the one or more separated tokens. Additionally, the computer executable components of the system can comprise a classification component that classifies a runtime log associated with the application based on the reduced number of the one or more separated tokens.

According to another embodiment, a computer program product that facilitates identification of an application irregularity can comprise a computer readable storage medium having program instructions embodied therewith. The program instructions can be executable by a processor and the processor can separate a file associated with a deployment declaration of an application, resulting in one or more separated tokens. The program instructions can also be executable to remove one or more unneeded tokens from the one or more separated tokens based on the one or more separated tokens. Furthermore, the program instructions can also be executable to classify a runtime log associated with the application based on the one or more separated tokens.

In some embodiments, one or more of the above elements described in connection with the systems, computer-implemented methods and/or computer program programs can be embodied in different forms such as a computer-implemented method, a computer program product, or a system.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The architecture of modern applications is experiencing a shift from monolith to micro-service. To adapt to this change, cloud operations are also shifting from being resource oriented to application oriented. To automatically deploy and manage these applications, declarative deployment can be utilized in such a cloud. Declarative deployment leverages a structural model to describe the desired application structure and state, which are then enforced by a deployment engine. The structural model can be regarded as a pattern or a template which contains the description primitives of the software components, application environment, and so on.

Application declarations can allow the applications to be clustered together to determine if they are operating properly. Thus, in a new cloud platform, applications can be classified based on their declarations. Based on runtime logs and deployment declarations, root causes of abnormal declarative data and log entries can be pinpointed. For purposes of this disclosure, normal declarative data satisfy a condition, whereas abnormal declarative data fails to satisfy the condition. This disclosure proposes a log model based problem diagnosis system for declaratively-deployed cloud applications. One or more embodiments described herein can facilitate log-based diagnosis for cloud-based applications.

One or more embodiments described herein include systems, computer-implemented methods, apparatus, and computer program products that facilitate log-based diagnosis for cloud-based applications.

Figure 1A:
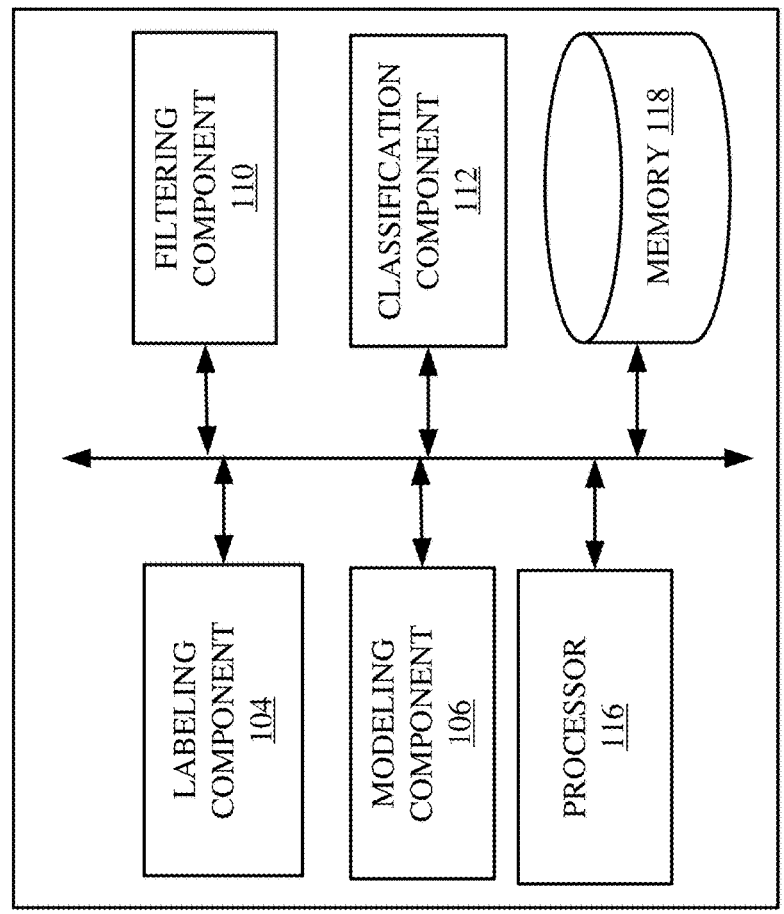
FIG. 1A illustrates a block diagram of an example, non-limiting application classification component in accordance with one or more embodiments described herein.

FIG. 1A illustrates a block diagram of an example, non-limiting application classification component in accordance with one or more embodiments described herein. In one embodiment, the application classification component 100A can comprise various sub-components (e.g., labeling component 104, modeling component 106, filtering component 110, classification component 112), processor 116, and memory 118 that can bi-directionally communicate with each other. It should also be noted that in alternative embodiments that other components including, but not limited to the sub-components, processor 116, and/or memory 118, can be external to the application classification component 100A.

Aspects of the processor 116 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the application classification component 100A. In an aspect, the application classification component 100A can also include memory 118 that stores computer executable components and instructions.

Deployment declarations, can describe a desired state of an application, initial state, and running state, to classify different kinds of applications. For example, the deployment declaration can describe the name of the application, which container image is used, and/or how the network is configured. It can also define the desired lifecycle state that a cloud should maintain (e.g., there are there replicas of the application up and running). Furthermore, the application's behavior can be tuned by environment variables and additional policies, such as resource limits and security settings. Thus, the deployment file can indicate the static characterization of the application.

Furthermore, different applications that belong to a same class can exhibit different behaviors, especially during a full lifecycle of the applications. Defined behaviors from application's heterogeneous lifecycles can be identified prior to a reference model being constructed. The reference model can then be generalized enough to depict an application during a time span and accurate enough to pinpoint specific log entries that are likely to be the root causes. Log entries can contain timestamps, thread identifications, source files, and a message body.

The application classification component 100A can classify multiple runtimes. Declaration data associated with an application can be received by the application classification component 100A. If the declaration data (e.g., human-readable serialization data) is unlabeled, then the labeling component 104 can label the declaration data. For instance, the labeling can comprise labeling the declarations based on a declaration template, an operation associated with the declaration (e.g., create, delete, etc.), and/or labeling the declaration data as a specific class of data. The declaration template can comprise common tokens for classified declarations.

Labeling the declaration data can allow the application classification component 100A to classify the declaration data as discussed below. Based on the labeling, data can be separated into different tokens (e.g., based on data capabilities, data functionalities, etc.). Tokenizing is a text processing function that can be associated with a natural language library. However, it should noted that other text processing functions including, but not limited to stemming, tagging, parsing, etc., can also be used with regards to this disclosure. For example, the tokens can be transformed into lower case, and then meaningless tokens (e.g., unnecessary tokens that have no meaning or functionality), such as stop words and punctuation marks, can be filtered out by the filtering component 110. Moreover, some pre-defined tokens can also be filtered out via the filtering component 110. After the filtering, the tokens can be taken as a text feature that can be input into a Naive Bayesian classifier to train the classification model.

In response to removing the extraneous tokens, the application classification component 100A can begin the classification process. The classification component 112 can comprise one or more classifiers. Such classification can employ a probabilistic and/or statistical-based analysis to prognose or infer an action that can be performed. A support vector machine (SVM) is an example of a classifier that can be employed. The SVM can operate by finding a hypersurface in the space of possible inputs. Other directed and undirected classification approaches include, for example, naïve Bayes, Bayesian networks, decision trees, neural networks, fuzzy logic models, and probabilistic classification models providing different patterns of independence can be employed.

Classification as used herein also may be inclusive of statistical regression that is utilized to develop models of priority. The disclosed aspects can employ classifiers that are explicitly trained (e.g., via generic training data) as well as implicitly trained (e.g., via observing the application declarations). Based on the necessary tokens and the labeled declarations, the classification component 112 can generate and output a classification model for use by the application classification component 100A. The classification component 112 can extract text data from the deployments to build a model for various types of deployments. The model can assist in determining a root cause of a problem (e.g., configuration problem, resource problem, network problem, cloud platform functional failures, erroneous application configurations, etc.) in both deploying and running phases. The model can also be a sequence model or an aggregation model. The sequence model can comprise an operation signature that can indicate an operation's start and end. The sequence model can also encode a log sequence with a weighted state machine, wherein the state can represent a log and the weight can represent a transition probability. Alternatively, the aggregation model can utilize a normal distribution model to represent the frequency of a log's occurrence.

It should also be noted that the application classification component 100 can comprise offline training, wherein the classification component 112 can extract text data from corresponding deployments and can classify the deployments via the Naïve Bayesian approach. The output of the offline training can be a group of classes, wherein the group of classes are a separate Naïve Bayesian network. During an online detection, an abnormal deployment can be classified by utilizing the pre-trained Naïve Bayesian model, and the output of the online detection can be a deployment label.

Given an abnormal deployment, the text data can also be extracted and fed into the Naive Bayesian classifier, where the classification component 112 can return the deployment class with the largest probability. To avoid a scenario where the value of the largest probability is too small, a predefined threshold can be set. If the largest probability is lower than the predefined threshold, then the abnormal deployment can be identified as new deployment. Once the problem is resolved by system operators, the new deployment can be added into a deployment repository.

When the application classification component 100A runs again, declarative-deployed applications can be compared against the classification model. The classification model can be extracted for various applications to determine whether a new deployment is normal or abnormal given the runtime log features. Thus, differences between the normal log characteristics and the log characteristics of the new deployment can be highlighted.

If the declarative-deployed application matches the model, then the declarative-deployed application can be used to further refine the model. However, if the declarative-deployed application does not match the model, then a difference between the declarative-deployed application and the model can be generated. The generated difference can be labeled as a root cause for the declarative-deployed application failing to match the model. The aforementioned process can be an iterative process allowing the application classification component 100 to adapt to and expand with every run.

An integrated sequence and aggregation model can also be trained, via the modeling component 106, to represent a defined state of the classified applications. When an application encounters problems, its log sequences and aggrega-tions can be examined against the model to determine an anomaly to indicate a potential root cause. Based on the examination against the model, the comparison component 108 can then localize the anomalies for the collected log data and output suspicious declarative primitives or log entries.

Figure 1B:
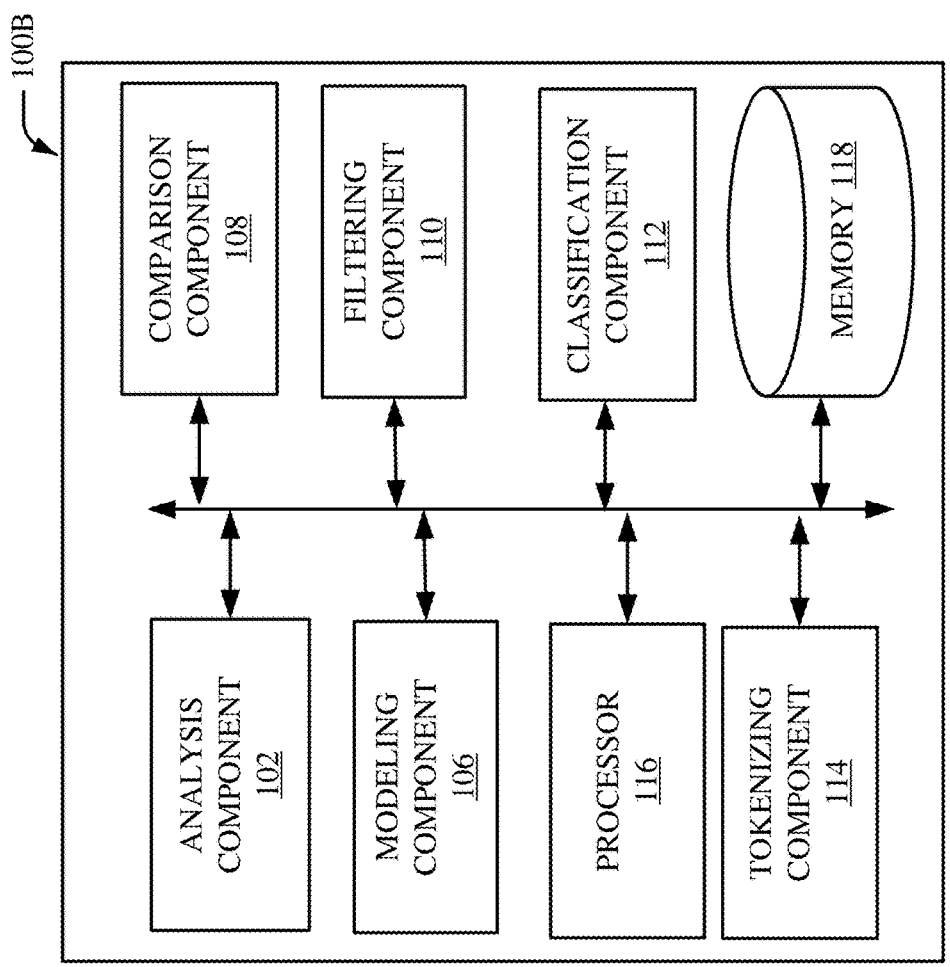
FIG. 1B illustrates a block diagram of an example, non-limiting application classification component in accordance with one or more embodiments described herein.

FIG. 1B illustrates a block diagram of an example, non-limiting application classification component in accordance with one or more embodiments described herein. In one embodiment, the application classification component 100B can comprise various sub-components (e.g., analysis component 102, modeling component 106, comparison component 108, filtering component 110, classification component 112, tokenizing component 114), processor 116, and memory 118 that can bi-directionally communicate with each other. It should also be noted that in alternative embodiments that other components including, but not limited to the sub-components, processor 116, and/or memory 118, can be external to the application classification component 100B. Repetitive description of like elements employed in other embodiments described herein is omitted for sake of brevity.

The classification component 100B can comprise the components of the application classification component 100A and further comprise an analysis component 102 and a comparison component 108. The application classification component 100B can be configured to tokenize and label deployment declarations associated with applications. The application classification component 100B can also classify multiple runtimes. For example, the analysis component 102 can receive or fetch declarations in the form of human-readable serialization data (e.g., yaml ain't mark-up language (YAML), declarations, etc.) from a deployment repository. The analysis component 102 can determine whether the declaration data is labeled or unlabeled. If the declaration data is unlabeled, then the labeling component 104 can label the declaration data. For instance, the labeling can comprise labeling the declarations based on a declaration template, an operation associated with the declaration (e.g., create, delete, etc.), and/or labeling the declaration data as a specific class of data. The declaration template can comprise common tokens for classified declarations.

When the application classification component 100B runs iteratively, declarative-deployed applications can be compared against the classification model via the comparison component 108. The classification model can be extracted for various applications to determine whether a new deployment is normal or abnormal given the runtime log features. Thus, differences between the normal log characteristics and the log characteristics of the new deployment can be highlighted.

If the declarative-deployed application matches the model, then the declarative-deployed application can be used to further refine the model. However, if the declarative-deployed application does not match the model, then a difference between the declarative-deployed application and the model can be generated. The generated difference can be labeled as a root cause for the declarative-deployed application failing to match the model. The aforementioned process can be an iterative process allowing the application classification component 100B to adapt to and expand with every run.

Figure 1C:
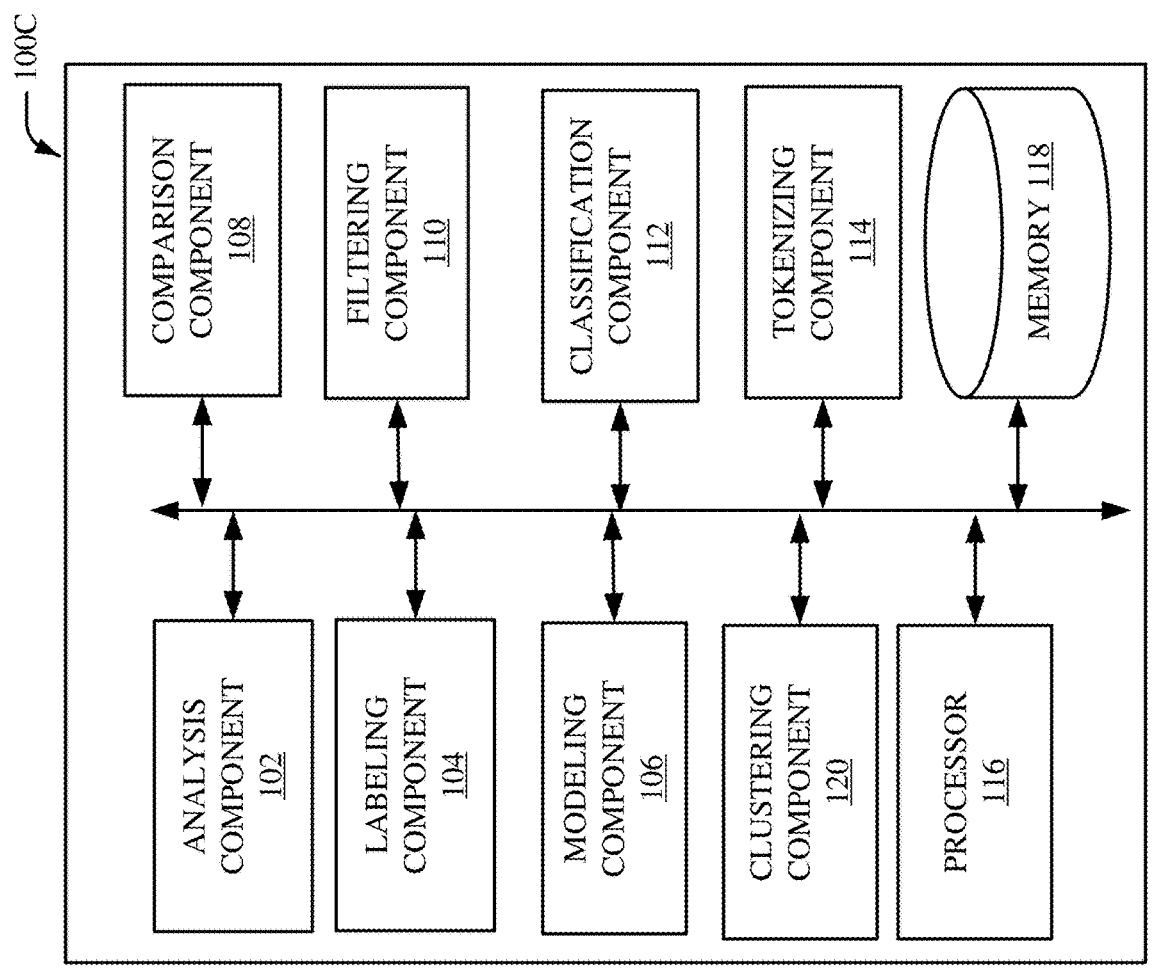
FIG. 1C illustrates a block diagram of an example, non-limiting application classification component in accordance with one or more embodiments described herein.

FIG. 1C illustrates a block diagram of an example, non-limiting application classification component in accordance with one or more embodiments described herein. In one embodiment, the application classification component 100C can comprise various sub-components (e.g., analysis component 102, labeling component 104, modeling component 106, comparison component 108, filtering component 110, classification component 112, tokenizing component 114, clustering component 120), processor 116, and memory 118 that can bi-directionally communicate with each other. The classification component 100C can comprise the components of the application classification component 100A and/or 100B and further comprise a labeling component 104 and a clustering component 120. It should also be noted that in alternative embodiments that other components including, but not limited to the sub-components, processor 116, and/or memory 118, can be external to the application classification component 100C. Repetitive description of like elements employed in other embodiments described herein is omitted for sake of brevity.

Aspects of the processor 116 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the application classification component 100C. In an aspect, the application classification component 100C can also include memory 118 that stores computer executable components and instructions.

The application classification component 100C can tokenize and/or label deployment declarations associated with applications. Deployment declarations, can describe a desired state of an application, initial state, and running state, to classify different kinds of applications.

The application classification component 100C can also classify multiple runtimes. For example, the analysis component 102 can receive or fetch declarations in the form of human-readable serialization data (e.g., YAML Ain't Markup Language (YAML), declarations, etc.) from a deployment repository. The analysis component 102 can determine whether the declaration data is labeled or unlabeled. If the declaration data is unlabeled, then the labeling component 104 can label the declaration data. For instance, the labeling can comprise labeling the declarations based on a declaration template, an operation associated with the declaration (e.g., create, delete, etc.), and/or labeling the declaration data as a specific class of data. The declaration template can comprise common tokens for classified declarations.

Based on a similarity between a first deployment declaration and a second deployment declaration, the clustering component 120 can group a first runtime log with a second runtime log. Therefore, during a template mining process, raw logs can be replaced with a matched template to generate a sequence of templates. During an online phase (as discussed later), templates have already been identified, and online raw logs can be mapped to the identified templates immediately. After transformation, variables associated with the templates can be replaced by a wild card "*" so that punctuation marks, and stop words can be screened out. During the template mining process, numbers, unique identifiers (UIDs), names of deployments, replica sets, pods, and nodes can be considered as the variables.

Figure 2:
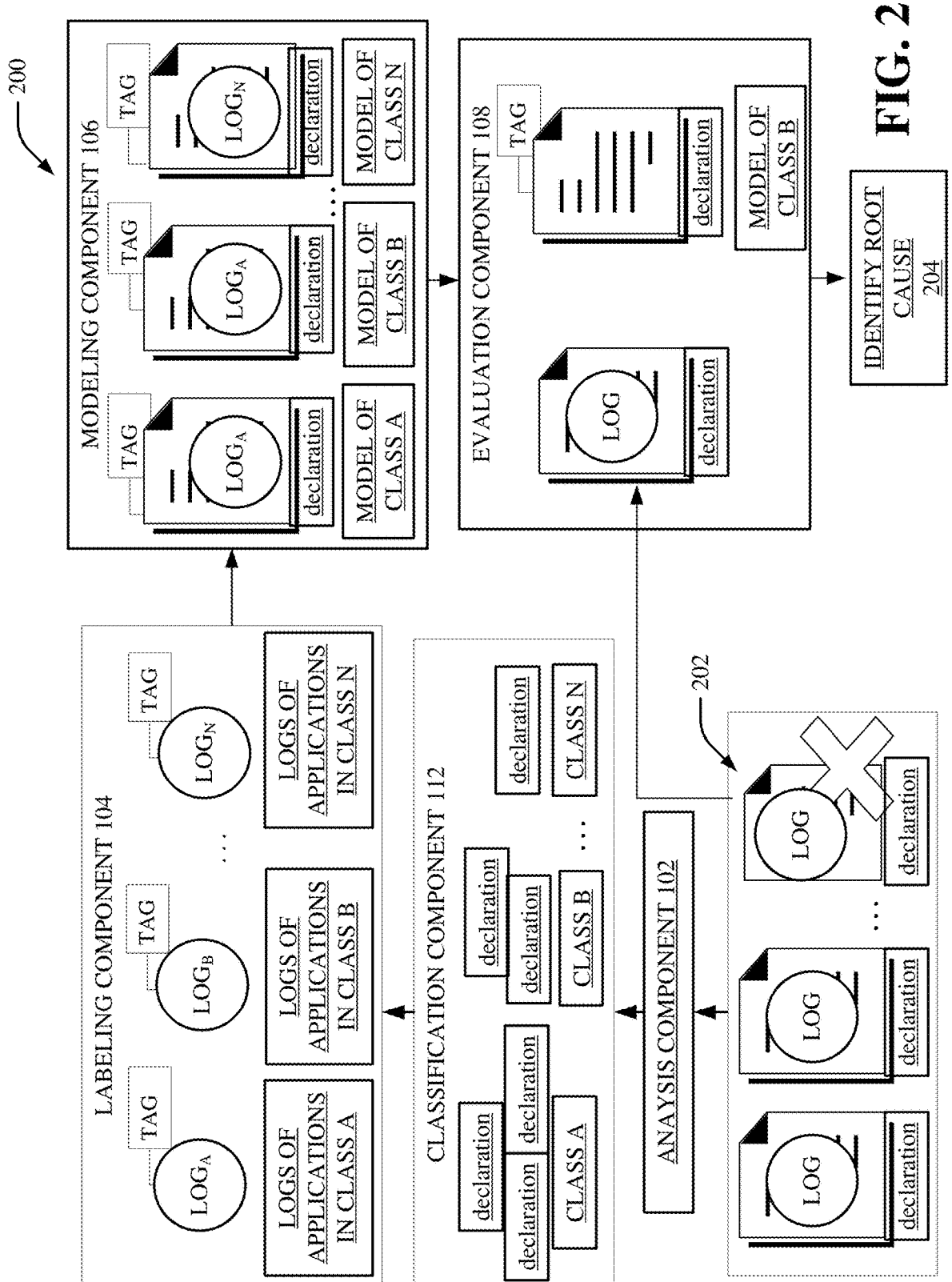
FIG. 2 illustrates another block diagram of an example, non-limiting system that facilitates application component classification in accordance with one or more embodiments described herein.

FIG. 2 illustrates another block diagram of an example, non-limiting system that facilitates application component classification in accordance with one or more embodiments described herein. Repetitive description of like elements employed in other embodiments described herein is omitted for sake of brevity.

In some embodiments, logs associated with deployed declarations of applications can be fetched or received from a deployment repository 202 by the analysis component 102. The system 200 can then classify the deployed declarations via the classification component 112. For example, the classification component 112 can classify logs from different applications based on text data associated with the application logs. In response to an output of the classification component 112, the labeling component 104 can then label the declaration data by tagging the logs of the now classified declarations. For example, if the declaration data is unlabeled, then the labeling component 104 can label the declaration data, wherein the labeling can comprise labeling the declarations based on a declaration template, an operation associated with the declaration (e.g., create, delete, etc.), and/or labeling the declaration data as a specific class of data. The declaration template can comprise common tokens for classified declarations.

Thereafter, a model can be generated via the modeling component 106. The model can be built as a function of the declarations and the logs received from the labeling component 104. Consequently, when an error occurs thereafter, a runtime log can be compared, via the comparison component 108, to the model generated via the modeling component 106. The comparison can highlight a difference between the model and the runtime log to determine a root cause 204 of the error.

Figure 3:
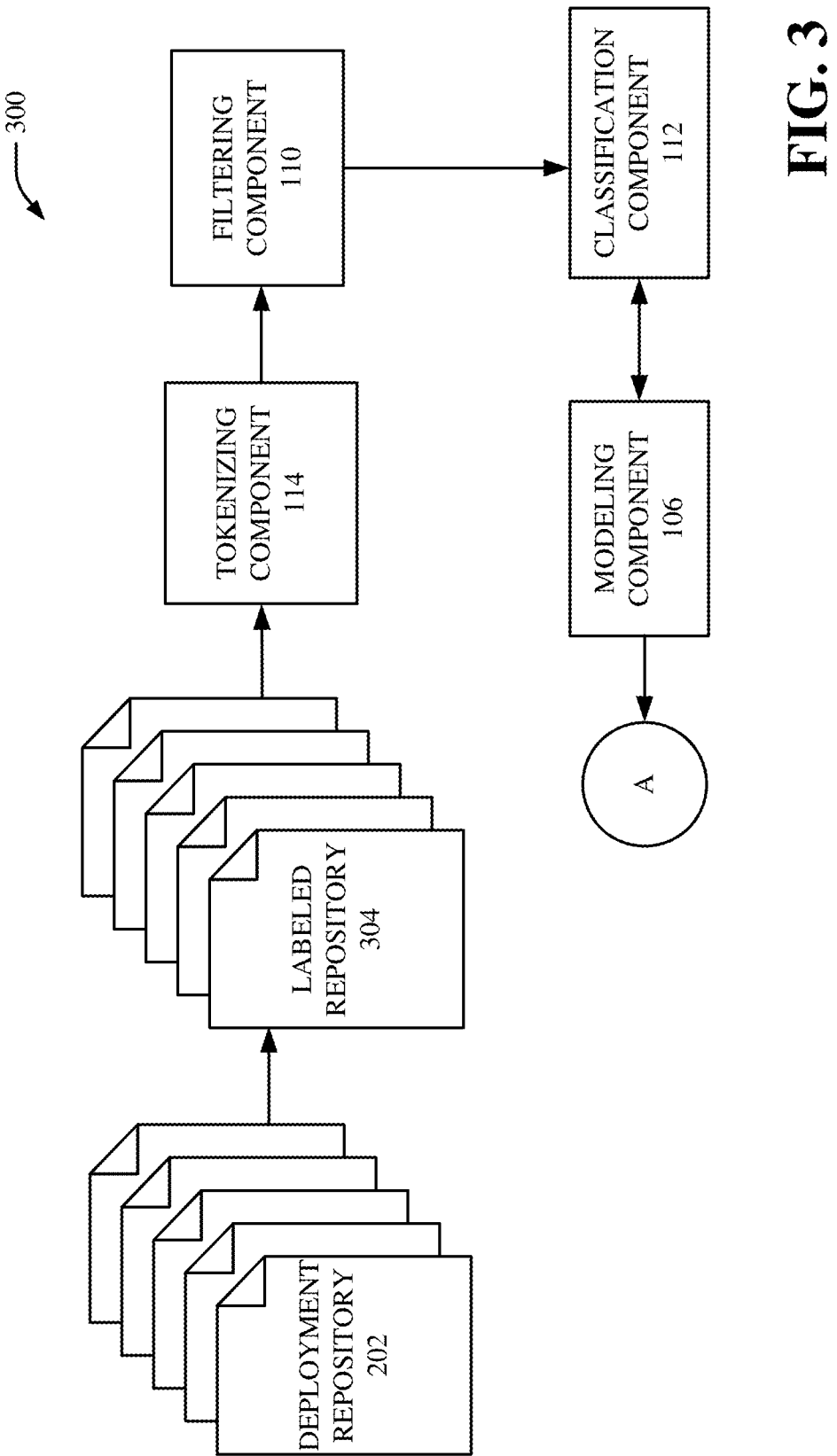
FIG. 3 illustrates yet another block diagram of an example, non-limiting system that facilitates a modeling process in accordance with one or more embodiments described herein.

FIG. 3 illustrates yet another block diagram of an example, non-limiting system that facilitates the modeling process in accordance with one or more embodiments described herein. Repetitive description of like elements employed in other embodiments described herein is omitted for sake of brevity.

In the embodiment shown in FIG. 3, the system 300 can first fetch the declarations from the deployment repository 202. Next, the labeling component 104 can label the declarations and store them in a labeled repository 304. The labeling can comprise labeling the declarations based on a declaration template, an operation associated with the declaration (e.g., create, delete, etc.), and/or labeling the declaration data as a specific class of data. In some embodiments, the system can assume that a declaration has previously been labeled and skip the labeling of the declaration. Thereafter, the tokenizing component 114 can tokenize the labeled declarations by separating them based on their capabilities, job function, etc.

Based on the tokenizing, the filtering component 110 can filter meaningless tokens such as stop words, punctuation marks, and/or predefined tokens. After the filtering, the tokens can be taken as a text feature that can be input into a classification component 112. The aforementioned input is then sent to the modeling component 106 to generate a classification model based on the declarations and their associated tokens. The model can be applied via block A as shown in reference to FIG. 4.

Figure 4:
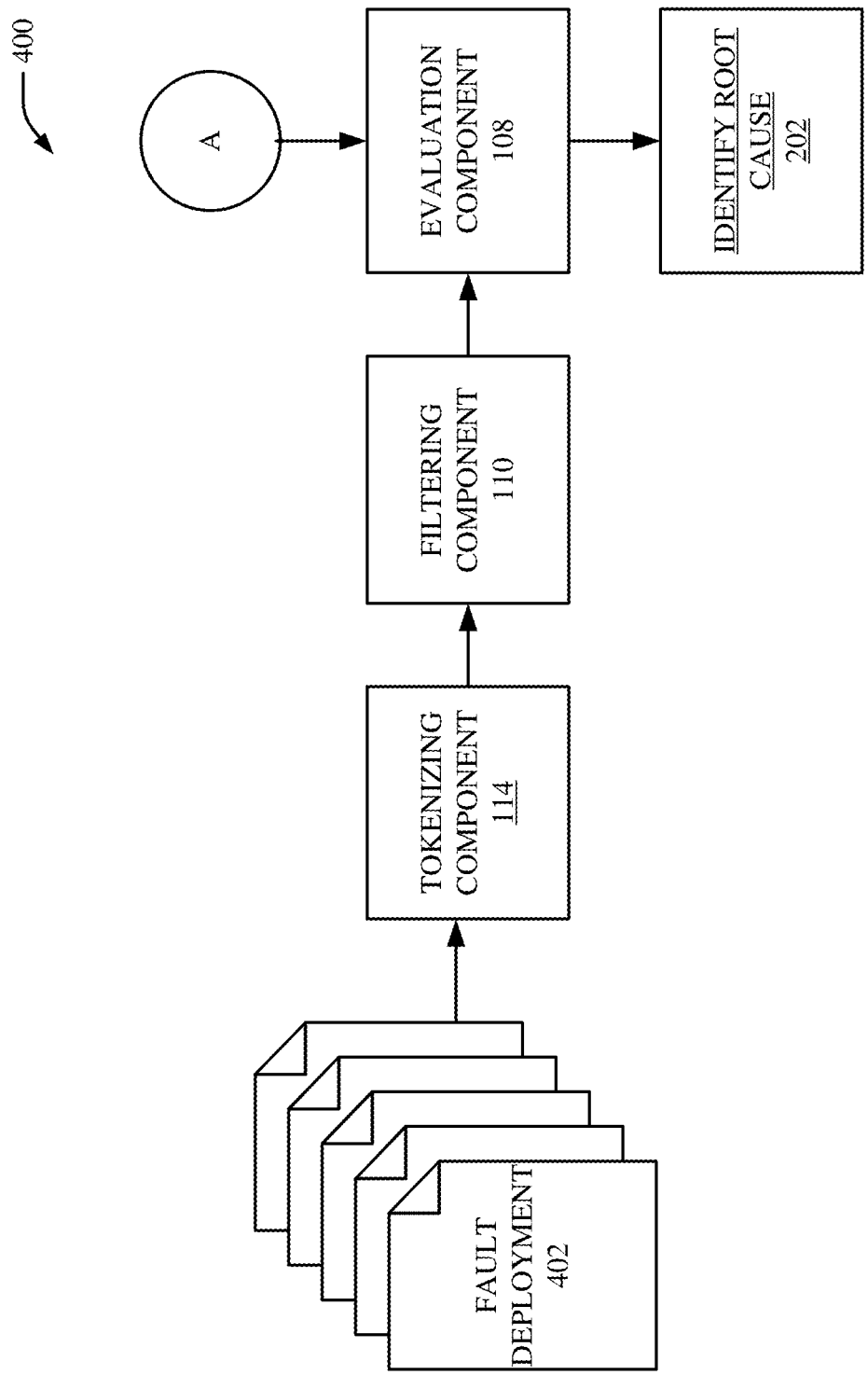
FIG. 4 illustrates yet another block diagram of an example, non-limiting system that applies a modeling process to a declaration in accordance with one or more embodiments described herein.

FIG. 4 illustrates yet another block diagram of an example, non-limiting system that applies the modeling to a declaration in accordance with one or more embodiments described herein. Repetitive description of like elements employed in other embodiments described herein is omitted for sake of brevity.

In the embodiment shown in FIG. 4, the system 400 can apply the model generated via the modeling component 106. Consequently, as the system 400 receives new declaration deployment data, the new declaration deployment data can be compared to the model. For example, an application can experience an error resulting in a fault deployment 402. The declaration from the fault deployment can be tokenized by the tokenizing component 114 prior to being filtered by the filtering component 110. The filtering component 110 can strip away data so that the comparison component 108 can compare the declaration to the model generated with reference to FIG. 3 (received from block A). The comparison of the faulty declaration to the previously generated model can then identify a root cause 202 of the error by highlighting the differences between the faulty declaration and the model.

Figure 5:
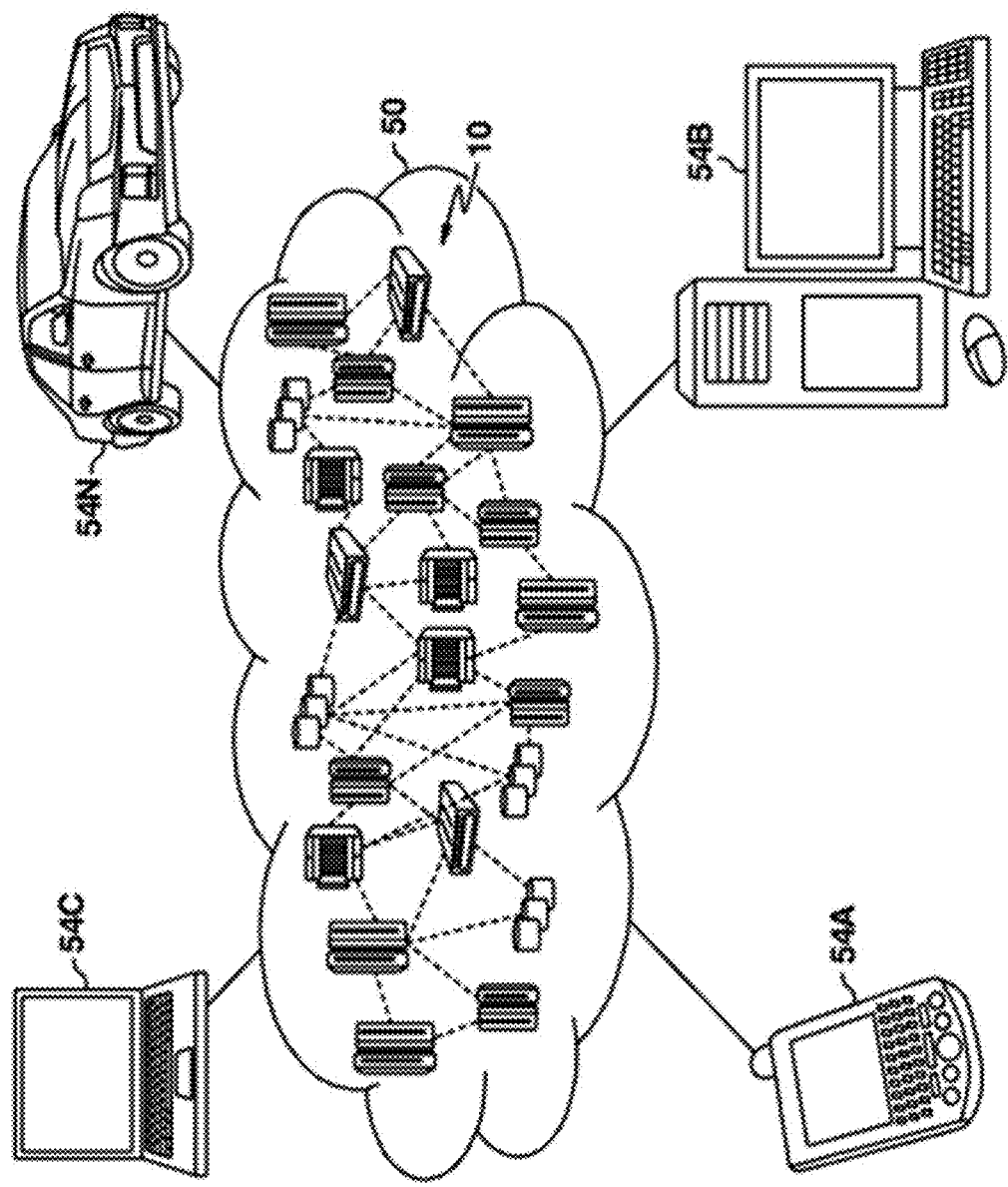
FIG. 5 illustrates a cloud computing environment according to one or more embodiments described herein.

FIG. 5 illustrates a cloud computing environment according to one or more embodiments described herein. Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
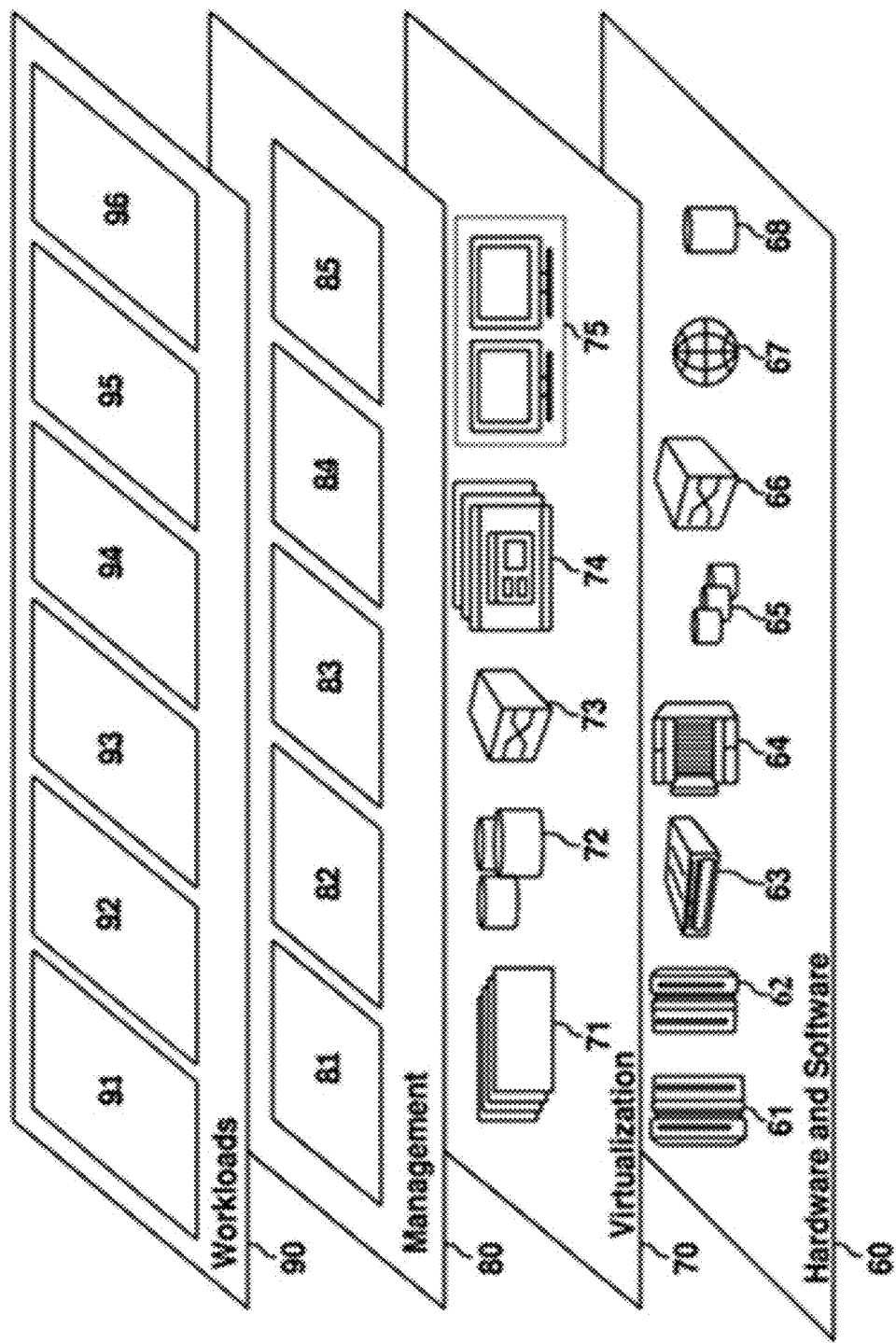
FIG. 6 illustrates abstraction model layers in accordance with one or more embodiments described herein.

FIG. 6 illustrates abstraction model layers in accordance with one or more embodiments described herein. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log-based diagnosis 96.

Figure 7:
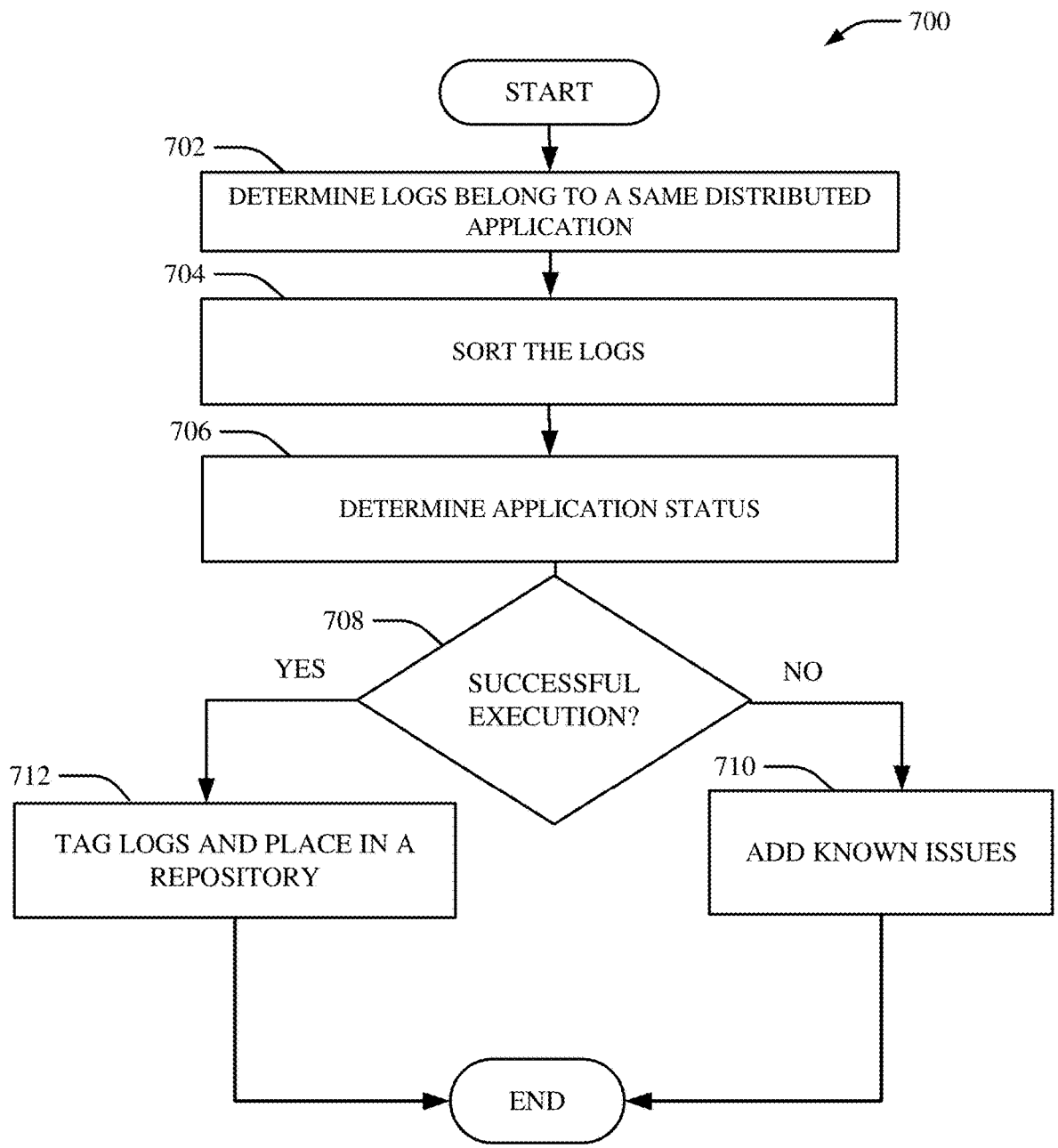
FIG. 7 illustrates a flow diagram of another example, non-limiting process that facilitates application classification in accordance with one or more embodiments described herein.

FIG. 7 illustrates a flow diagram of another example, non-limiting application classification process in accordance with one or more embodiments described herein. Repetitive description of like elements employed in other embodiments described herein is omitted for sake of brevity.

In one embodiment, the application classification process can determine that logs belong to a same distributed application at element 702. This correlation can be determined based on identification data (e.g., pod name, pod identification, container ID, etc.) that can then be used to sort the logs at element 704. Based on the log status, which can be indicated via the sorting process of element 704, a status of the application can be determined at element 706. For example, if the application is running efficiently, there is a successful execution at element 708 and then the application can be tagged via the labeling component 104 and placed in the deployment repository 202 at element 712. Alternatively, if there is not a successful execution of the application at element 708, the errors associated with an unsuccessful execution can be added to a repository of known errors and/or issues at element 710 before the application classification process 700 comes to an end.

Figure 8:
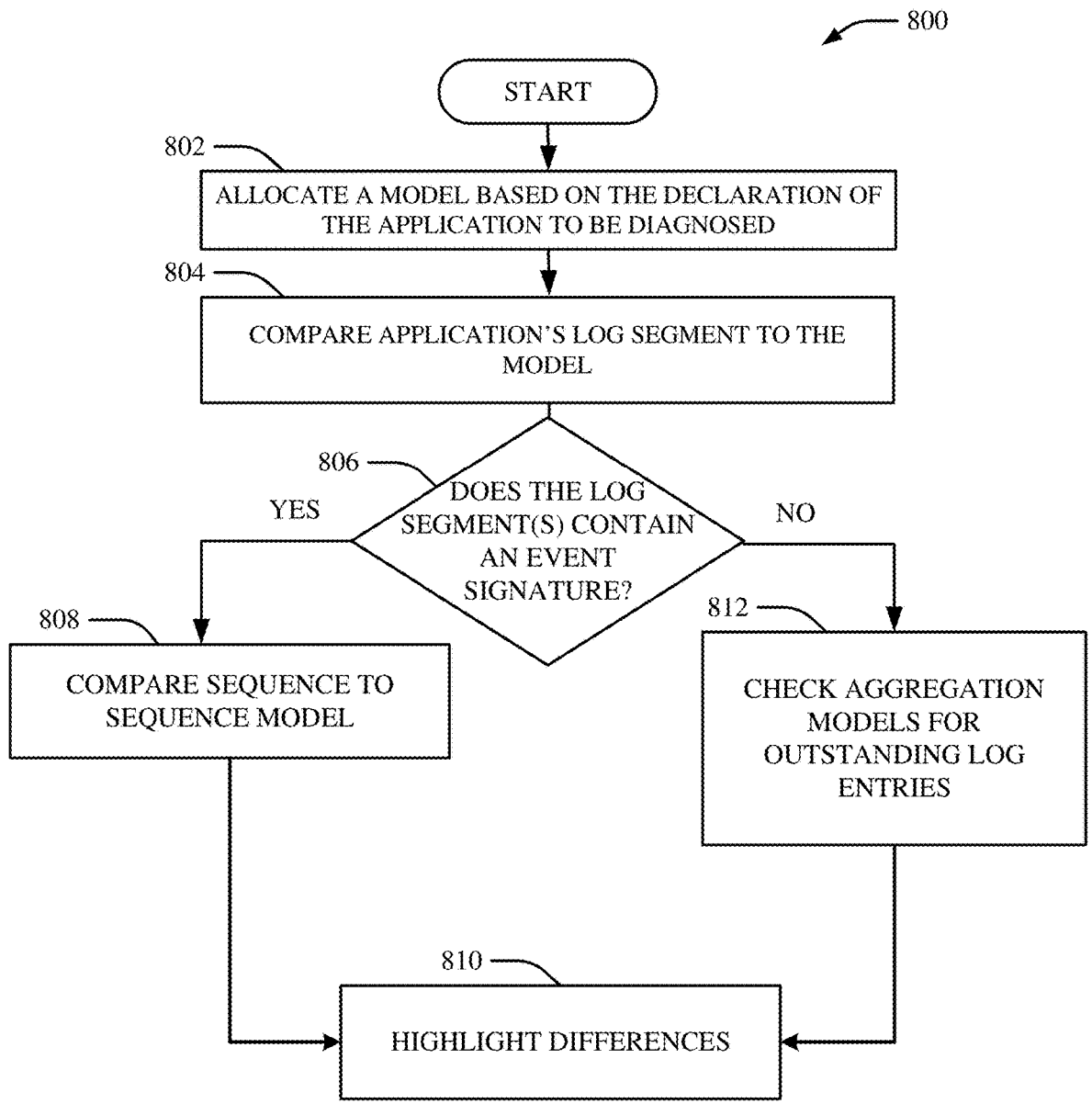
FIG. 8 illustrates a flow diagram of an example, non-limiting computer-implemented process that facilitates application classification in accordance with one or more embodiments described herein.

FIG. 8 illustrates a flow diagram of an example, non-limiting system that facilitates an application classification process in accordance with one or more embodiments described herein. Repetitive description of like elements employed in other embodiments described herein is omitted for sake of brevity.

At element 802, the process 800 can allocate a model based on a declaration of the application to be diagnosed. The model can be allocated from a repository storing previously generated models. At element 804, the log segment of the application can be compared to the model. If the log segment contains an event signature at element 806, then a sequence can be compared to an operation sequence model at element 808, and the differences between the sequence and the sequence model can be highlighted at element 810. However, if the segment does not contain an event signature, then the system can check aggregation models for outstanding log entries at element 812 and then highlight the differences between the log segment and the outstanding log entries at 810.

Figure 9:
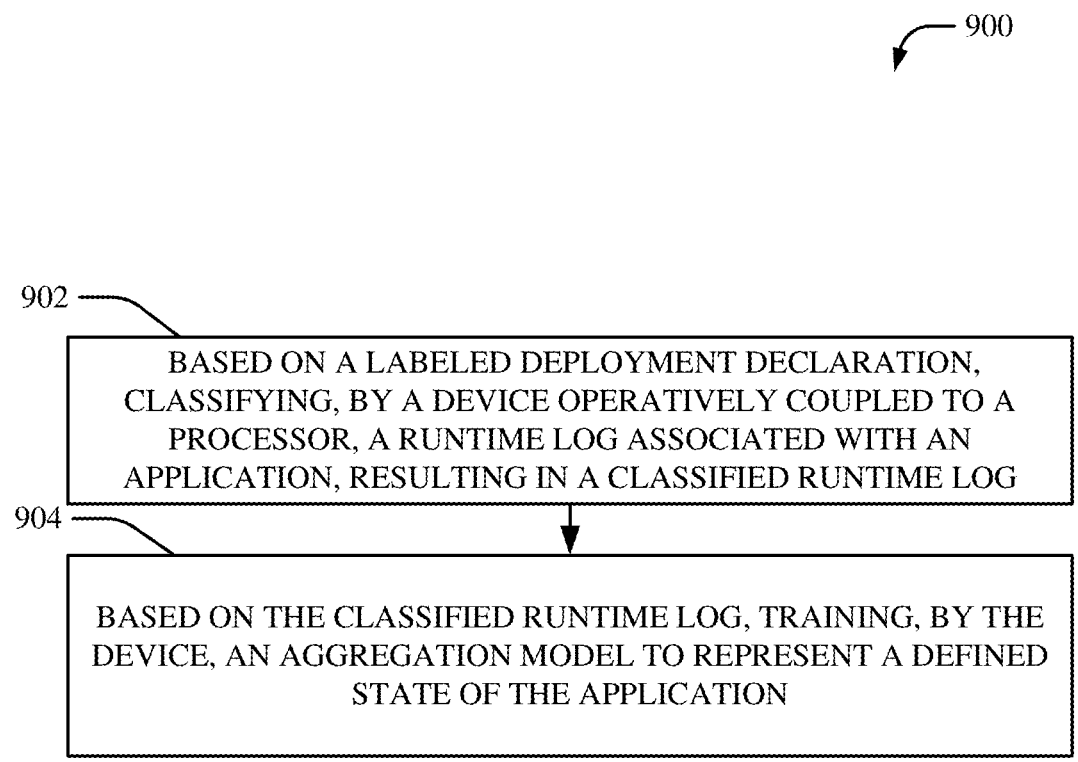
FIG. 9 illustrates a flow diagram of another example, non-limiting computer-implemented method that facilitates application classification in accordance with one or more embodiments described herein.

FIG. 9 illustrates a flow diagram of another example, non-limiting computer-implemented method 900 that facilitates application classification in accordance with one or more embodiments described herein. Repetitive description of like elements employed in other embodiments described herein is omitted for sake of brevity.

At element 902, the method can comprise classifying (e.g., by the classification component 112) a runtime log associated with an application based on a labeled deployment application, resulting in a classified runtime log. If the declaration data is unlabeled, then the labeling component 104 can label the declaration data. For instance, the labeling can comprise labeling the declarations based on a declaration template, an operation associated with the declaration (e.g., create, delete, etc.), and/or labeling the declaration data as a specific class of data. Labeling the declaration data can allow the application classification component 100C to classify the declaration data. Additionally, based on the classified runtime log, the method can comprise training (e.g., by the modeling component 106) an aggregation model to represent a defined state of the application at element 904.

Figure 10:
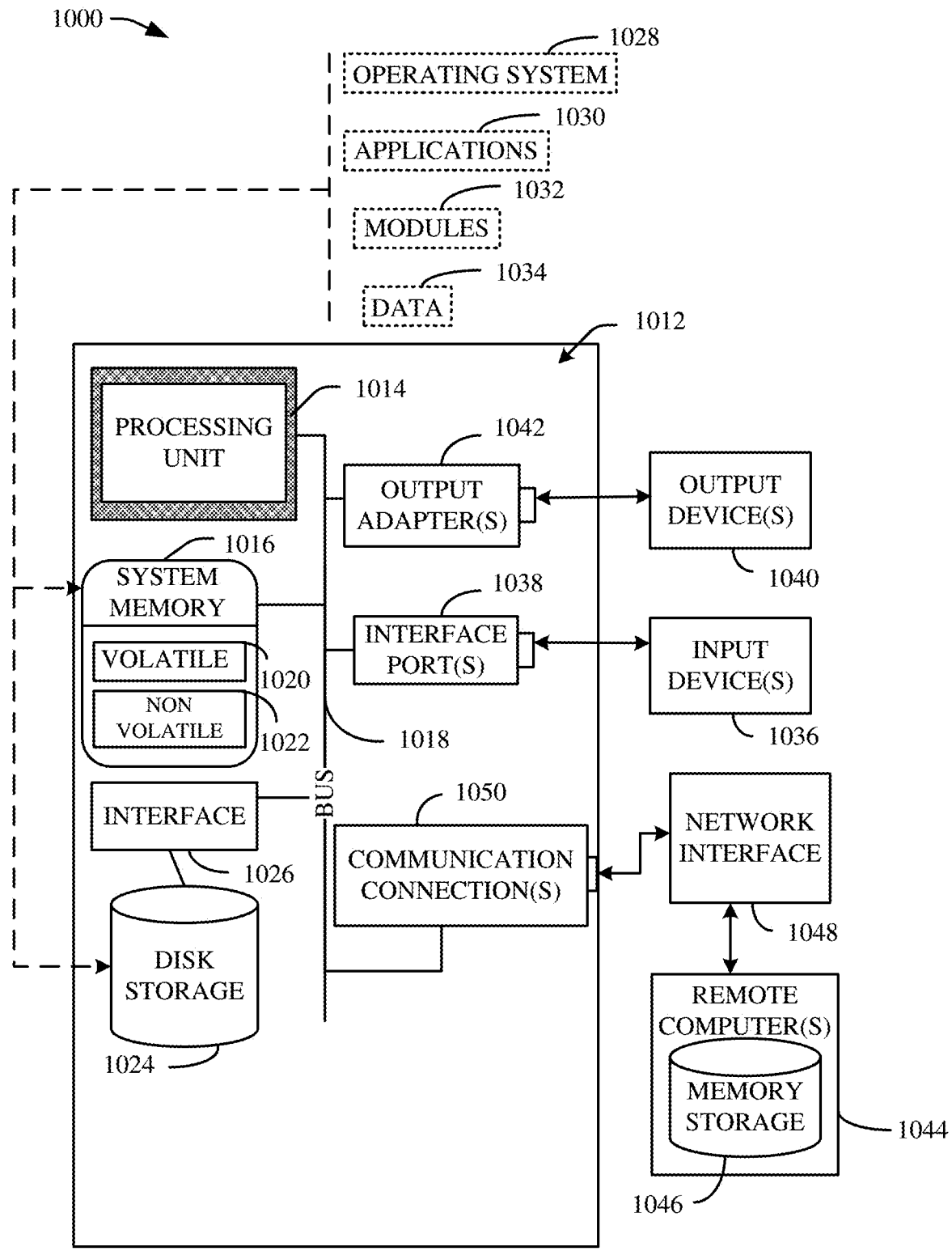
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has,"

"possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a classification component that:
         based on a labeled deployment declaration of an application, classifies a runtime log associated with the application, resulting in a classified runtime log; and
      a training component that:
         based on the classified runtime log, trains an aggregation model to represent a defined state of the application, wherein the runtime log is a first runtime log, wherein the deployment declaration is a first deployment declaration; and:
      a clustering component that:
         based on a similarity between the first deployment declaration and a second deployment declaration, groups the first runtime log with a second runtime log.

2. The system of claim 1, wherein the computer executable components further comprise:
   a comparison component that compares the aggregation model to a log sample to identify a root cause of a problem, wherein the problem is a configuration problem associated with the application.

3. The system of claim 2, wherein the application is a first application, wherein the problem is a first problem, and wherein the comparison component compares the first runtime log to a second runtime log associated with a second application based on a second problem the second application has been determined to have encountered.

4. The system of claim 2, wherein the application is a first application, and wherein the comparison component compares the first deployment declaration to a second deployment declaration associated with the aggregation model to generate root cause analysis data associated with a potential root cause of the problem experienced by a second application.

5. The system of claim 1, wherein the labeled deployment declaration comprises a token for use in classification of the runtime log.

6. The system of claim 5, wherein the classification of the runtime log comprises utilizing a Naïve Bayesian classifier to generate a deployment label.

7. A computer program product that facilitates log-based diagnosis for declarative-deployed applications, the computer program product comprising a computer readable storage medium having program instructions embodied therewith, the program instructions executable by a processor to cause the processor to:
   based on a labeled deployment declaration, classify a runtime log associated with the application, resulting in a classified runtime log; and
   based on the classified runtime log, train an aggregation model to represent a defined state of the application, wherein the runtime log is a first runtime log, wherein the deployment declaration is a first deployment declaration; and
   based on a similarity between the first deployment declaration and a second deployment declaration, group the first runtime log with a second runtime log.

8. The computer program product of claim 7, wherein the program instructions are further executable by the processor to cause the processor to:
   compare the aggregation model to a log sample to identify a potential root cause of a problem, wherein the problem is a configuration problem associated with the application.

9. The computer program product of claim 8, wherein the application is a first application, and wherein the program instructions are further executable by the processor to cause the processor to:
   compare the first runtime log to a second runtime log associated with a second application based on the problem the second application has been determined to have encountered.

10. The computer program product of claim 8, wherein the application is a first application, and wherein the program instructions are further executable by the processor to cause the processor to:
    compare the first deployment declaration to a second deployment declaration associated with the aggregation model to generate root cause analysis data associated with the potential root cause of the problem experienced by a second application.

11. The computer program product of claim 8, wherein the program instructions are further executable by the processor to cause the processor to:
    store the runtime log and an operation log associated with the application in a database for access by a comparison component.

12. The computer program product of claim 7, wherein the labeled deployment declaration comprises a token for use in classifying the runtime log.

13. A computer-implemented method, comprising:
    based on a labeled deployment declaration, classifying, by a device operatively coupled to a processor, a runtime log associated with an application, resulting in a classified runtime log;
    based on the classified runtime log, training, by the device, an aggregation model to represent a defined state of the application, wherein the runtime log is a first runtime log, wherein the deployment declaration is a first deployment declaration; and
    based on a similarity between the first deployment declaration and a second deployment declaration, grouping, by the device, the first runtime log with a second runtime log.

14. The computer-implemented method of claim 13, further comprising:
    comparing, by the device, the aggregation model to a log sample to identify a potential root cause of a problem, wherein the problem is a configuration problem associated with the application.

15. The computer-implemented method of claim 14, wherein the application is a first application, wherein the runtime log is a first runtime log, and further comprising:

comparing, by the device, the first runtime log to a second runtime log associated with a second application based on the problem the second application has been determined to have encountered.

16. The computer-implemented method of claim 14, wherein the application is a first application, and further comprising:

comparing, by the device, the first deployment declaration to a second deployment declaration associated with the aggregation model to generate root cause analysis data associated with the potential root cause of the problem experienced by a second application.

17. The computer-implemented method of claim 13, wherein the application is a first application, and further comprising:

comparing, by the device, the first deployment declaration to a second deployment declaration associated with the aggregation model to generate root cause analysis data associated with a potential root cause of a problem experienced by a second application.

\* \* \* \* \*